(12) United States Patent
Andelman (10) Patent No.: US 9,336,503 B2
(45) Date of Patent: May 10, 2016

(54) VALUE AT RISK INSIGHTS ENGINE

(71) Applicant: Wal-Mart Stores, Inc., Bentonville, AR (US)

(72) Inventor: Alex Daniel Andelman, Bella Vista, AR (US)

(73) Assignee: Wal-Mart Stores, Inc., Bentonville, AR (US)

( * ) Notice: Subject to any disclaimer, the term of this patent is extended or adjusted under 35 U.S.C. 154(b) by 400 days.

(21) Appl. No.: 13/947,851

(22) Filed: Jul. 22, 2013

(65) Prior Publication Data

US 2015/0025933 A1    Jan. 22, 2015

(51) Int. Cl.
*G06F 7/60* (2006.01)
*G06Q 10/06* (2012.01)

(52) U.S. Cl.
CPC ................ *G06Q 10/0635* (2013.01)

(58) Field of Classification Search
None
See application file for complete search history.

(56) References Cited

U.S. PATENT DOCUMENTS

| | | | | |
|---|---|---|---|---|
| 7,305,351 B1* | 12/2007 | Bechhofer | ......... | G06Q 10/0635 705/7.28 |
| 2003/0149657 A1* | 8/2003 | Reynolds | ............... | G06Q 10/06 705/38 |
| 2005/0060245 A1* | 3/2005 | Hoffman | ................ | G06Q 10/06 705/28 |
| 2006/0111927 A1* | 5/2006 | Sereville | ............ | G06Q 10/0635 705/7.28 |
| 2008/0221944 A1* | 9/2008 | Kelly | ................ | G06Q 10/0635 705/7.28 |
| 2009/0265199 A1* | 10/2009 | Moerdler | ............... | G06Q 10/00 705/7.39 |
| 2010/0145734 A1* | 6/2010 | Becerra | .................. | G06Q 40/08 705/4 |
| 2010/0179847 A1* | 7/2010 | Cope | ................ | G06Q 10/06311 705/7.28 |
| 2013/0151229 A1* | 6/2013 | Braman | ............. | G06F 17/5009 703/22 |

OTHER PUBLICATIONS

Gençay, Ramazan, Faruk Selçuk, and Abdurrahman Ulugülyağci. "High volatility, thick tails and extreme value theory in valueat-risk estimation." Insurance: Mathematics and Economics 33.2 (2003): 337-356.*
Zambon, Emmanuele, et al. "Model-based mitigation of availability risks." Business-Driven IT Management, 2007. BDIM'07. 2nd IEEE/IFIP International Workshop on. IEEE, 2007.*

* cited by examiner

*Primary Examiner* — Omar Fernandez Rivas
*Assistant Examiner* — Nithya J Moll
(74) *Attorney, Agent, or Firm* — Schmeiser, Olsen & Watts LLP (57) ABSTRACT

A method for risk mitigation comprises calculating on at least one processor, a likelihood of occurrence for a risk event, a degree of disruption for the risk event and a disruption time for the risk event. Each risk event is in a list of risk events. The likelihood of occurrence is based on a frequency of risk of the risk event. The degree of disruption is based on a severity of risk of the risk event. The disruption time is based on a duration of restoring an asset to a condition prior to the risk event. A value at risk based on the likelihood of occurrence, the degree of disruption and the disruption time is determined for the risk event. A mitigation action is determined to reduce the value at risk. An indication of the mitigating action is presented on a user interface.

14 Claims, 7 Drawing Sheets

VALUE AT RISK INSIGHTS ENGINE

FIELD OF THE INVENTION

The invention relates generally to determining a change in value of commercial merchandise caused by risk events. More specifically, the invention relates to minimizing the diminution of the value of merchandise in commerce when confronted with various risk events and objectively determining a mitigation action based thereon.

BACKGROUND

Each year businesses are confronted with a variety of events that risk damaging their value proposition. For example, natural disasters such as hurricanes and floods damage stores, interrupt supply chains and alter the short-term inventory needs. In some cases, a store cannot open or supply the required inventory of merchandise. In other cases, the existing supply of inventory cannot be replenished at a rate to satisfy consumer response to the natural hazard. Often, the demands of the consumer change in response to the hazard. For example, a short term need for generators and other emergency supplies could replace a previous need for perishable items. In a network of stores, the balance of inventory across the network would also change to meet the needs of a local store impacted by the hazard.

Business continuity and the ability to provide humanitarian support to those affected by the natural hazard require an objective assessment of the risk to a store based on previous patterns. A need exists for a method to provide guidance to minimize the loss in value of the business enterprise.

BRIEF SUMMARY

In one aspect, the invention features a method for risk mitigation comprising storing in a first memory module of an Incident Management (IM) system, a list of risk events for a plurality of stores. Each risk event in the list of risk events has a frequency of risk and a severity of risk. A list of insurance claims for the stores is stored in a second memory module of a Claim Zone (CZ) system. Each insurance claim in the list of insurance claims has a duration of restoring an asset to a condition prior to the risk event. The asset is contained in one of the stores. A likelihood of occurrence for one of the risk events in the list of risk events and for one of the stores in the plurality of stores is calculated. The likelihood of occurrence is based on the frequency of risk. A degree of disruption for one of the risk events in the list of risk events and for one of the stores in the plurality of stores is calculated. The degree of disruption is based on the severity of risk. A disruption time for one of the risk events in the list of risk events and for one of the stores in the plurality of stores is calculated. The disruption time is based on the duration of restoring the asset to the condition prior to the risk event. A value at risk is determined for one of the risk events in the list of risk events and for one of the stores in the plurality of stores. The value at risk is based on the likelihood of occurrence, the degree of disruption and the disruption time. A mitigating action is determined to reduce the value at risk.

In another aspect, the invention features a method risk mitigation comprising calculating on at least one processor, a likelihood of occurrence for a risk event in a list of risk events. The likelihood of occurrence is based on a frequency of risk of the risk event. A degree of disruption for the risk event in the list of risk events is calculated on the at least one processor. The degree of disruption is based on a severity of risk for the risk event. A disruption time for the risk event in the list of risk events is calculated on the at least one processor. The disruption time is based on a duration of restoring an asset to a condition prior to the risk event. A value at risk based on the likelihood of occurrence, the degree of disruption and the disruption time is determined for the risk event in the list of risk events. A mitigating action is determined to reduce the value at risk. An indication of the mitigating action is presented on a user interface.

In another aspect, the invention features a computer program product for risk mitigation. The computer program product comprises a non-transitory computer readable storage medium having computer readable program code embodied therewith, the computer readable program code comprising computer readable program code configured to calculate on at least one processor, a likelihood of occurrence for a risk event in a list of risk events. The likelihood of occurrence is based on a frequency of risk of the risk event. A computer readable program code is configured to calculate on the at least one processor, a degree of disruption for the risk event in the list of risk events. The degree of disruption is based on a severity of risk of the risk event. A computer readable program code is configured to calculate on at least one processor, a disruption time for the risk event in the list of risk events. The disruption time is based on a duration of restoring an asset to a condition prior to the risk event. A computer readable program code is configured to determine for the risk event in the list of risk events, a value at risk based on the likelihood of occurrence, the degree of disruption and the disruption time. A computer readable program code is configured to determine a mitigating action to reduce the value at risk. A computer readable program code is configured to present an indication of the mitigating action on a user interface.

BRIEF DESCRIPTION OF THE SEVERAL VIEWS OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Embodiments of systems described herein provide for an objective determination of risks presented to business enterprises. For example, location specific plans are realized to minimize or mitigate the impact of natural hazards such as floods or hurricanes. Non-limiting examples of mitigation plans include resource allocation, resource replenishment and modifying sales forecast. During periods where the risk of hurricanes is high due to seasonal weather patterns or a forecasted track of a spawned hurricane, data from previous natural disasters, the cost impact due to past insurance claims and consumer behavior before and after the hurricane is used to determine the optimal mitigation strategy. A specific example is reduction or reallocation of meat products and vegetables in exchange for mops, brooms, generators and dry ice. These mitigation strategies improve the resilience of the commercial business and enable additional humanitarian support in a time of crisis.

Figure 1:
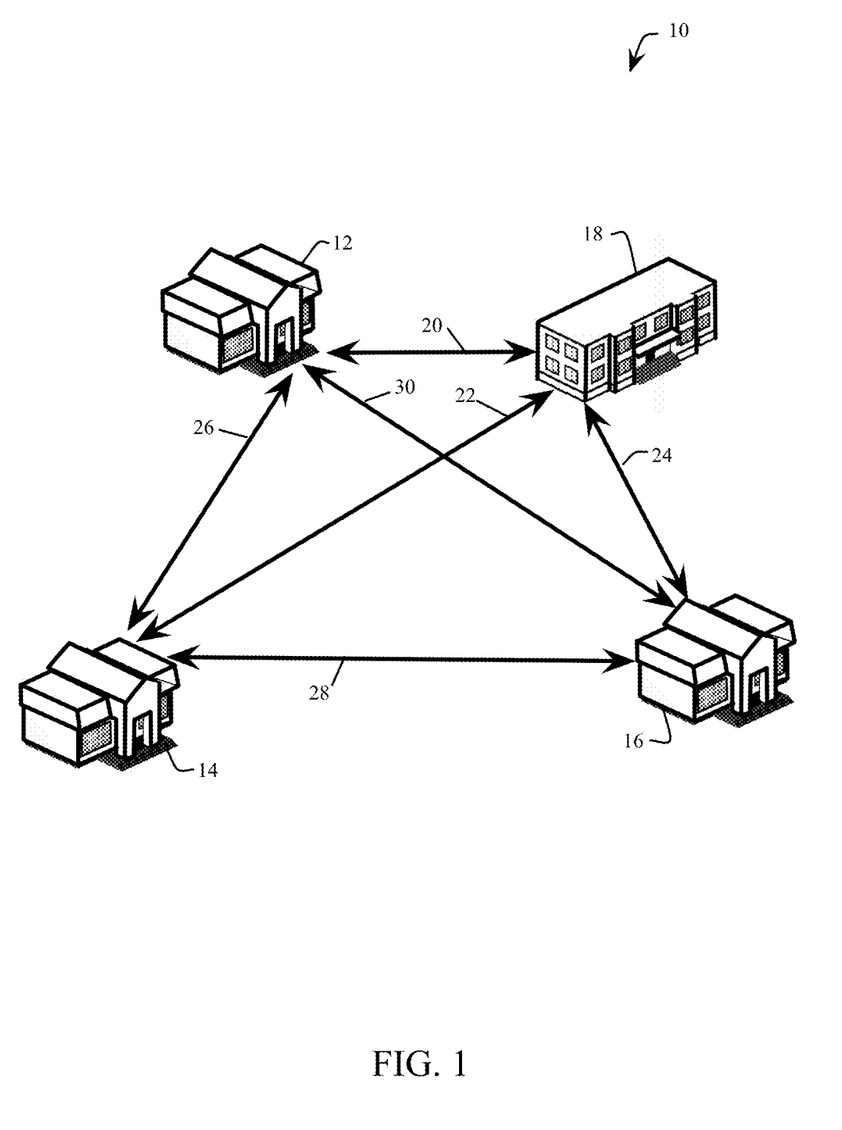
FIG. 1 is a perspective view of a network of stores and a distribution center.

FIG. 1 illustrates a network 10 of stores and a distribution center. A plurality of stores 12, 14 and 16 and a distribution center 18 share inventory of products. Stores are establishments where merchandise is sold, both in retail markets and in wholesale markets. In one embodiment, stores further include services such as cosmetics consultants to aide consumers in purchasing certain cosmetics, for example. Inventory is transferred from the distribution center 18 to stores 12, 14 and 16 through transportation channels 20, 22 and 24 respectively. Inventory is also transferred directly between stores to serve the changing needs of local establishments. For example, inventory moves from store 12 to store 14 through a transportation channel 26, from store 14 to store 16 through a transportation channel 28 and from store 16 to store 12 through a transportation channel 30. Channels include transportation by land (e.g. road and rail), sea and air.

For example, when there is a short term change in specific inventory required at stores 14 and 16 due to a flood that affects these two stores, the inventory is transferred from store 12 to stores 14 and 16 when insufficient inventory exists at the distribution center 18 or when exigency requires faster transportation channels to the stores 14 and 16. In another example, the risk is a fluctuation in consumer demand not related to a natural hazard, due to loss of a competitor in a just-in-time (JIT) environment. A JIT environment keeps supply levels at a minimum to reduce storage costs but requires very accurate demand forecasts and rapid reallocation of supplies. When a risk event affects stores that are geographically close, service providers are also redeployed to other stores. For example, deployable services include assembly of emergency products (e.g. generators) and local transportation between stores and a consumer's home.

Figure 2:
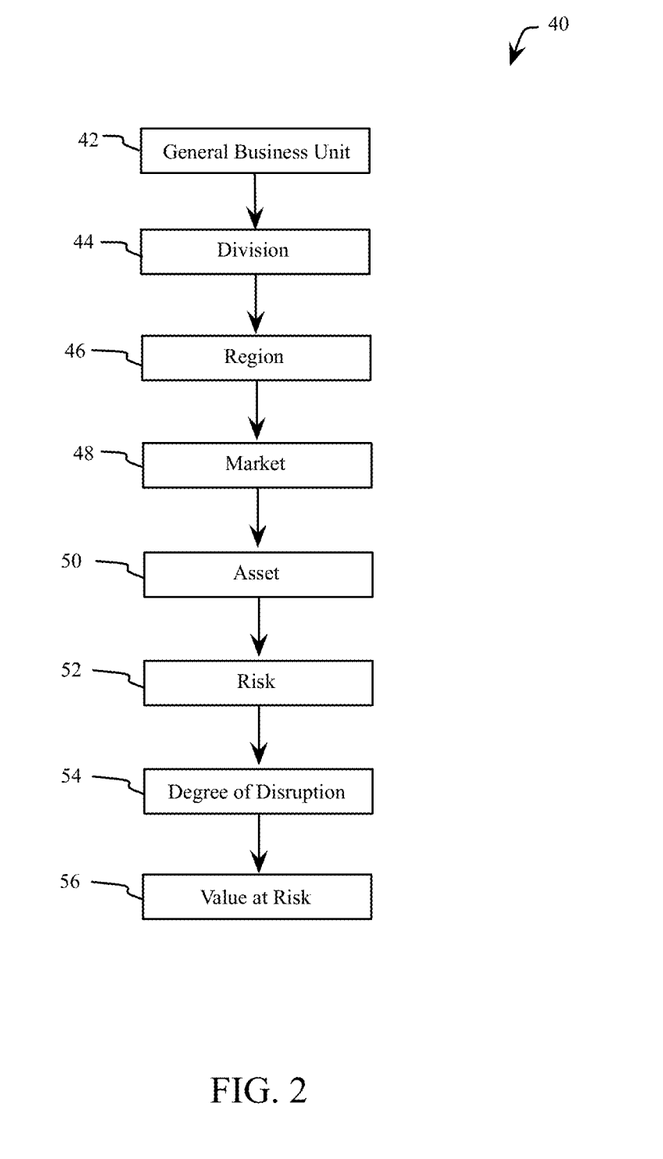
FIG. 2 is a flowchart representation of a parameter selection process to determine a value at risk.

Local store managers, area managers and insurance companies, each can request a determination of the value at risk. Other interested parties also initiate the request for a determination of value at risk in other examples. FIG. 2 shows a preferred embodiment 40 of the parameters used to determine a value at risk. A Geographic Business Unit (GBU) is first selected at step 42. At step 44 a division within a GBU is selected. At step 46, a region within a division is selected. At step 48, a market is selected. An example of a market is automotive products. At step 50, an asset is selected. An example of an asset is a store. At step 52, a specific risk is selected. An example of a risk is a loss of power due to a hurricane. At step 54, a Degree of Disruption (DOD) is selected. An example of a DOD is a complete power failure as compared to a partial power failure (e.g. a substation failure limits the amount of power each household can use). At step 56, the value at risk is determined based on the parameters selected in the embodiment 40.

In other embodiments, one or more selections are made for each step 42 through 54, producing one or more value at risk determinations at step 56. The value at risk determination at step 56 is further used to determine a mitigating action. In one example, a mitigating action includes moving generators from store 12 to stores 14 and 16 shown in FIG. 1.

Figure 3:
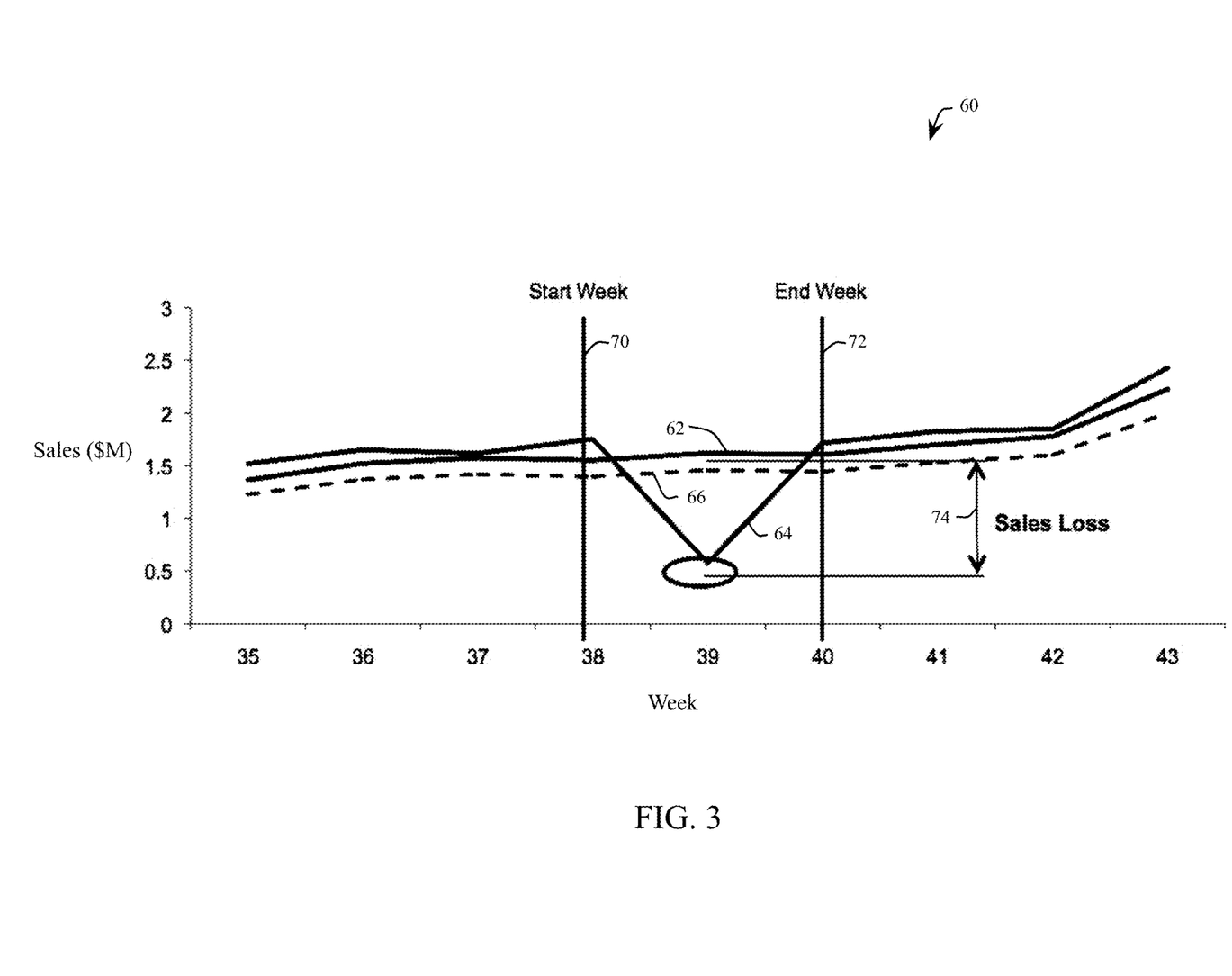
FIG. 3 is a graphical view of sales disruption due to a risk event.

FIG. 3 illustrates a timeline of sales activity 60 over an eight-week period (e.g. weeks 35 through 43) with a disruption in sales due to a risk event. A sales forecast 62 and an actual sales level 64 are acceptably above the minimum tolerable sales level 66 for weeks 35 through 38. The start week 70 marks the beginning of a risk event (e.g. a hurricane) occurring at week 38, and results in a sales disruption. The end week 72 marks the end of the disruption after implementation of the mitigation action and occurs at week 40. During the sales disruption period between end week 72 and start week 70 a sales loss 74 occurs. Different mitigation strategies are used depending on whether sales loss 74 or disruption time (e.g. the duration between the end week 72 and the start week 70) are minimized. In one example, minimizing disruption time at store 14 is achieved by diverting product from store 12 to store 14 at the expense of sales loss from store 12.

Figure 4:
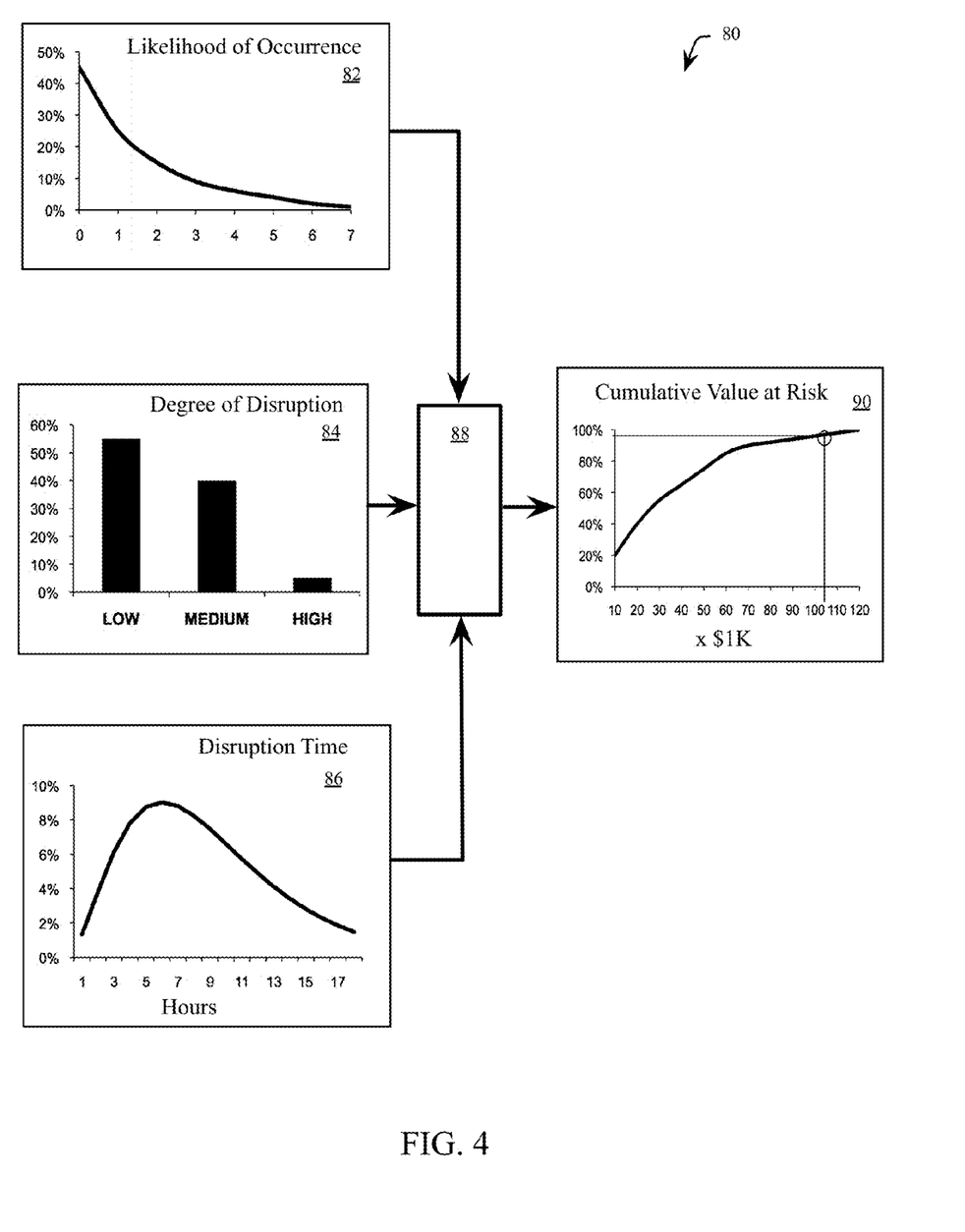
FIG. 4 is a flowchart representation of a system to determine the value at risk according to an embodiment of the present invention.

FIG. 4 represents a system 80 to determine the value at risk selected by the parameters in FIG. 2. For a chosen geographical area and risk event, a Likelihood of Occurrence 82, a Degree of Disruption 84 and a Disruption Time 86 are input to a computational block 88 to produce a cumulative value at risk 90. The Likelihood of Occurrence 82 is a statistical measure of the probability that a particular risk event will occur based on the frequency and distribution of previous occurrences of that risk event, as well as assumptions on how the frequency and distribution could change in the future. For example, the likelihood of a hurricane is affected by global climate trends as well as previous hurricane tracks.

The Degree of Disruption 84 is based on the severity of previous risk events. For example, a hurricane could cause low disruption by damaging traffic lights, thereby complicating travel and reducing sales volume. A hurricane could cause medium disruption by knocking out power to a store, thereby reducing sales volume by requiring cash only transactions or emergency power generators, for example. A hurricane could cause high disruption by closing stores and streets with damage to critical infrastructure. In one example, the Degree of Disruption 84 is selected by the user (as shown in FIG. 2). In another example, all degrees of disruption are considered, each with a respective Likelihood of Occurrence 82.

The Disruption Time 86 is a statistical measure of the duration that sales volume is affected as a result of the risk event (as shown in FIG. 3). In one example, the Disruption Time 86 begins when the risk event occurs and includes the time required to reallocate or replenish inventory. In another example, the disruption time is primarily determined by the time required to activate standby power generators for a store, when consumer demands remain unchanged.

In a preferred embodiment, the computational block 88 performs a Monte Carlo simulation of the Likelihood of Occurrence 82, Degree of Disruption 84 and Disruption Time 86 inputs to produce the Cumulative Value at Risk 90. For example, when the Disruption Time 86 and the Degree of Disruption 84 are both discrete values, the computation block 88 uses a simple scaling of the Likelihood of Occurrence 82. When the Disruption Time 86, the Degree of Disruption 84, and the Likelihood of Occurrence 82 are each discrete values, the computational block 88 uses a simple multiplication and produces a discrete value for the Cumulative Value at Risk 90.

In another embodiment, the computational block 88 includes inputs for demographic information. For example, certain populations have more experience and capability in dealing with certain risk events and thus will be less likely to purchase emergency supplies that might otherwise be required. In another embodiment, the computational block 88 includes inputs for subject matter expertise. Various sources of subject matter expertise are used including research from external organizations not directly associated with the store, internal surveys, continuous improvement programs and other sources of historical data. External organizations include government, non-profit organizations and academia. Internal surveys include structured surveys to gather feedback from subject matter experts across functional areas of the company. Continuous improvement programs include simulations of mock disaster recovery scenarios. Historical data includes global weather patterns, consumer behavior, historical performance of the supply chain (e.g. stores and suppliers to the store), and the results of a periodic census.

Figure 5:
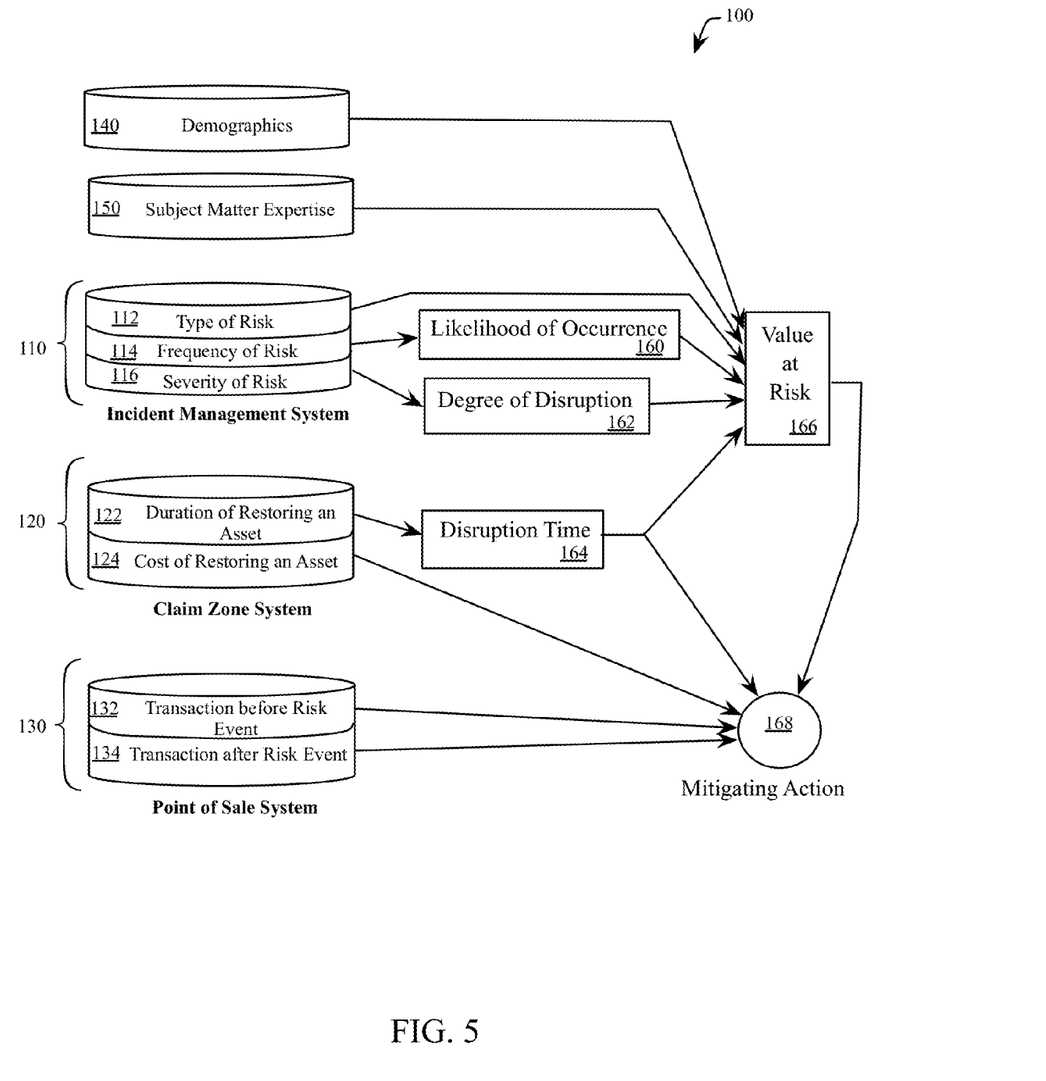
FIG. 5 is a flowchart representation of a system to determine a mitigating action according to an embodiment of the present invention

FIG. 5 illustrates a system 100 to determine a mitigating action. An Incident Management System 110 includes a Type of Risk 112, a Frequency of Risk 114 and a Severity of Risk 116. A Type of Risk 112 includes natural disasters such as hurricanes and floods, man-made disasters such as cyber-attacks, and other unexpected events such as changes in consumer demand due to a change in the competitive landscape (e.g. losing or gaining a competitor). A Frequency of Risk 114 includes historical data describing how often a particular risk event has occurred. The frequency need not be uniformly distributed over time. The Severity of Risk 116 describes the historical impact of each risk on the value at risk. For example, a risk event that is a hurricane could cause minor traffic delays, could interrupt power to a store or could shut down a wide geographic area. In one embodiment, the Severity of Risk 116 is quantified in distinct categories or ranges. In another embodiment, the Severity of Risk 116 is a linear scale.

A Claim Zone System 120 includes a Duration of Restoring an Asset 122 and a cost of Restoring an Asset 124. In one example, the Duration of Restoring an Asset 122 is measured from the time that the damage to the asset is discovered, an insurance claim is made and the asset is repaired or restored. A Cost of Restoring an Asset 124 includes the funds paid from an insurance claim and in any residual not covered by the claim. In one example, the restoration returns the asset to the condition substantially the same as a condition just prior to the risk event.

A Point of Sale System 130 includes a Transaction before Risk Event 132 and a Transaction after Risk Event 134. With reference to FIG. 5 and FIG. 3, the difference between the Transaction before Risk Event 132 and the Transaction after Risk Event 134 is a measure of the change in consumer demand due to the risk event and results in a sales loss 74.

A Demographics database 140 includes information related to consumer behavior based on a characteristic of the population represented. A Subject Matter Expertise database 150 includes information from external organizations, internal surveys, continuous improvement programs and other sources of historical data.

The Frequency of Risk 114 is used to determine a Likelihood of Occurrence 160, which includes historical events and the trends of such events. The Severity of Risk 116 is used to determine a Degree of Disruption 162. In one embodiment, the Degree of Disruption 162 is quantified in distinct ranges. In another embodiment, the Degree of Disruption 162 is a continuous linear scale. The Duration of Restoring an Asset 122 is used to determine a Disruption Time 164. The Disruption Time 164 includes the time that a damaged asset affects sales even prior to detecting the damage to the asset.

In one embodiment, the Likelihood of Occurrence 160, the Degree of Disruption 162 and the Disruption Time 164 are used to determine a Value at Risk 166. In another embodiment, Demographics 140 and Subject Matter Expertise 150 is also used to determine the Value at Risk 166 as further described in FIG. 4.

A Mitigating Action 168 is determined based on one or more of the Value at Risk 166, the Disruption Time 164, the Cost of Restoring an Asset 124 and the difference between the Transaction after Risk Event 134 and the Transaction before Risk Event 132. Different mitigating actions are determined based on the priority of optimizing value, time, cost or lost sales or a combination thereof. For example, minimizing operational down time may be more important to the brand of a company than a short-term loss in sales.

Figure 6:
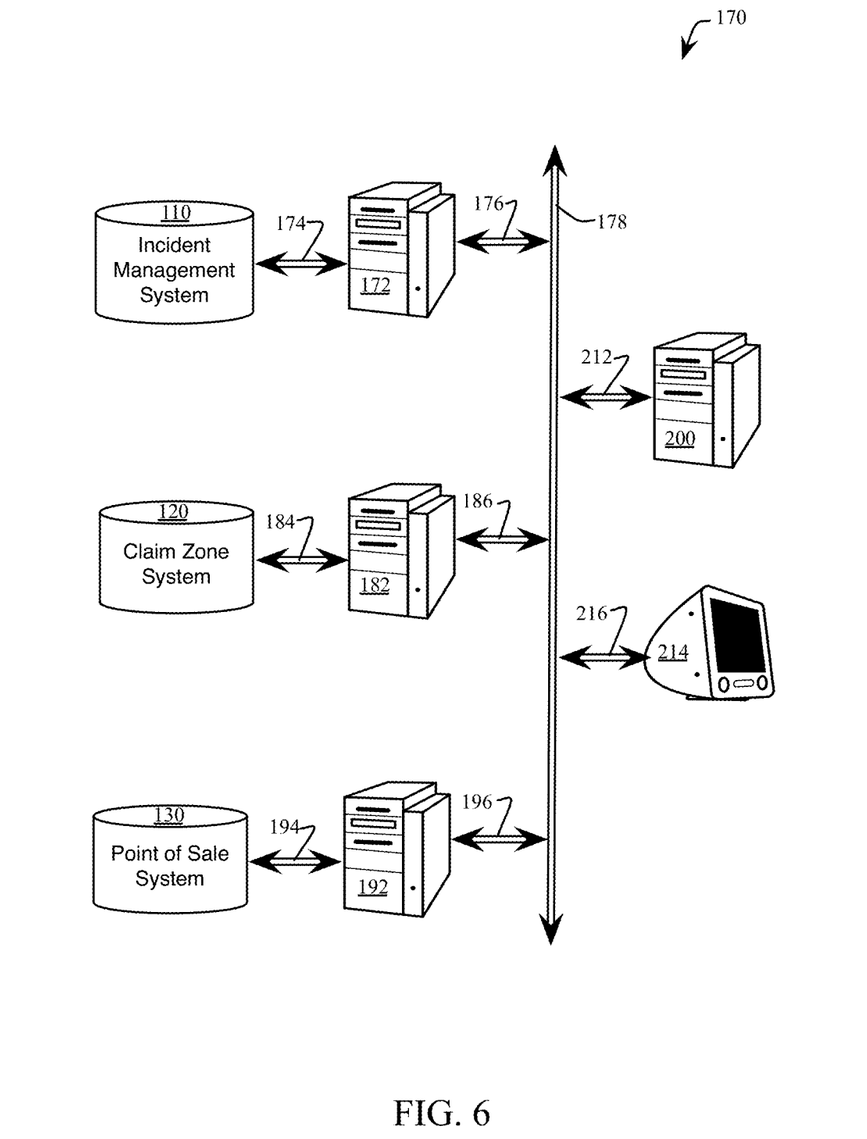
FIG. 6 is a schematic view illustrating a system for determining and displaying a mitigating action.

FIG. 6 is an embodiment 170 of the value at risk insights engine described in FIG. 5. The Incident Management System 110 is connected to a processor 172 by a bus 174. The processor 172 calculates a Likelihood of Occurrence 160, and a Degree of Disruption 162 then transfers this calculated information over a bus 176 to a shared bus 178. The processor 172 also transfers a Type of Risk 112 to the shared bus 178. The Claim Zone System 120 is connected to a processor 182 by a bus 184. The processor 182 calculates a Disruption Time 164, and transfers this calculated information over a bus 186 to the shared bus 178. The processor 182 also transfers the Cost of Restoring an Asset 124 to the shared bus 178. The Point of Sale System 130 is connected to a processor 192 by a bus 194. The processor 192 calculates a difference between a Transaction after Risk Event 134 and a Transaction before Risk Event 134, and transfers this calculated information over a bus 196 to the shared bus 178. A shared processor 200 is connected to the shared bus 178 by a bus 212. The shared processor 200 receives data from the shared bus 178 and determines both a Value at Risk 166 and a Mitigating Action 168. The shared processor 200 displays an indication of the Mitigating Action 168 on a user interface 214, which is connected to the shared bus 178 by a bus 216. In one embodiment, the user interface 214 is a monitor. In another embodiment, the user interface 214 is a printer. In a preferred embodiment, the Incident Management System 110, Claim Zone System 120 and Point of Sale System 130 are each stored in a memory module, which is a form of computer readable storage medium.

Figure 7:
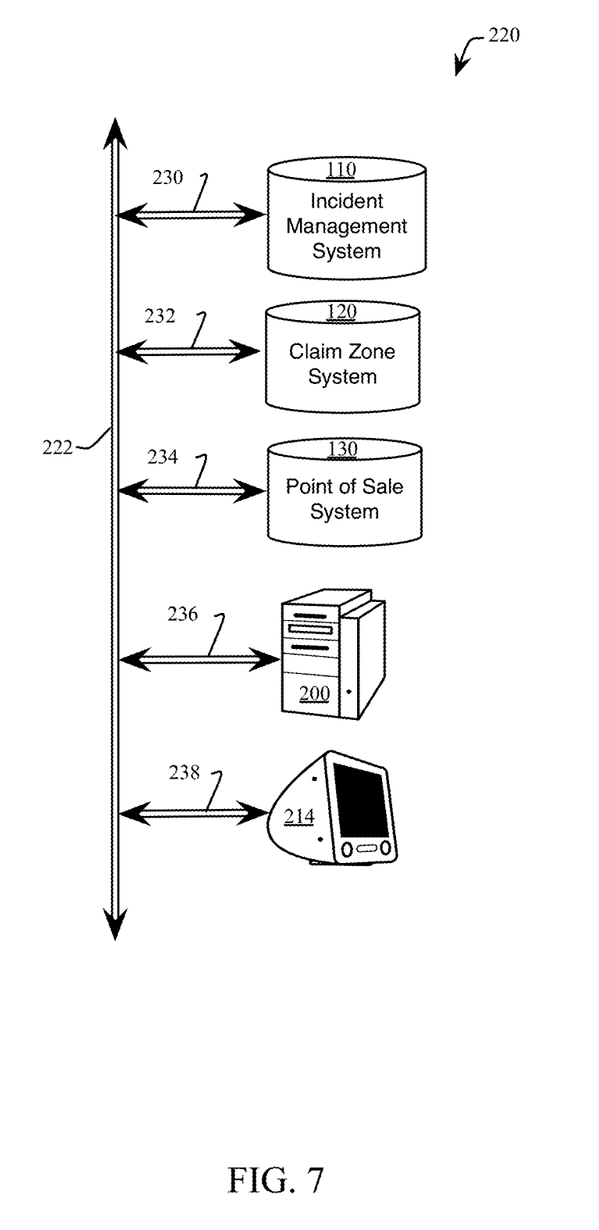
FIG. 7 is a schematic view illustrating a system for determining and displaying a mitigating action.

FIG. 7 is an embodiment 220 of the value at risk insights engine described in FIG. 5. The Incident Management System 110 is connected to a shared bus 222 through bus 230. The Claim Zone System 120 is connected to the shared bus 222 through bus 232. The Point of Sale System 130 is connected to the shared bus 222 through bus 234. A shared processor 200 is connected to the shared bus 222 through bus 236. The shared processor 200 received data from the Incident Management System 110, Claim Zone System 120 and Point of Sale System 130 and determines a Likelihood of Occurrence 160, a Degree of Disruption 162, a Disruption Time 164 and a difference between a Transaction after Risk Event 134 and a Transaction before Risk Event 134. The shared processor 200 determines both a Value at Risk 166 and a Mitigating Action 168. The shared processor 200 displays an indication of the Mitigating Action 168 on a user interface 214, which is connected to the shared bus 222 by a bus 238. In one embodiment, the user interface 214 is a monitor. In another embodiment, the user interface 214 is a printer. In a preferred embodiment, the Incident Management System 110, Claim Zone System 120 and Point of Sale System 130 are each stored in a memory module, which is a form of computer readable storage medium.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been shown and described with reference to specific preferred embodiments, it should be understood by those skilled in the art that various changes in form and detail may be made therein without departing from the spirit and scope of the invention as defined by the following claims.

What is claimed is:

1. A computer-implemented method for risk mitigation comprising:

storing in a first memory module of an Incident Management (IM) system, a received list of risk events for a plurality of stores, each risk event in the list of risk events having a frequency of risk and a severity of risk;

storing in a second memory module of a Claim Zone (CZ) system, a received online list of insurance claims for the stores, each insurance claim in the list of insurance claims having a duration of restoring an asset to a condition prior to the risk event, the asset contained in one of the stores;

calculating by a special purpose computer processor a likelihood of occurrence for one of the risk events in the list of risk events and for one of the stores in the plurality of stores, the likelihood of occurrence based on the frequency of risk;

calculating by a special purpose computer processor a degree of disruption for one of the risk events in the list of risk events and for one of the stores in the plurality of stores, the degree of disruption based on the severity of risk;

calculating by a special purpose computer processor a disruption time for one of the risk events in the list of risk events and for one of the stores in the plurality of stores, the disruption time based on the duration of restoring the asset to the condition prior to the risk event;

determining by a special purpose computer processor for one of the risk events in the list of risk events and for one of the stores in the plurality of stores a value at risk, the value at risk based on the likelihood of occurrence, the degree of disruption and the disruption time; and determining by a special purpose computer processor a mitigating action to reduce the value at risk, wherein determining the mitigating action includes at least one of exchanging the asset in one store in the plurality of stores with a different asset in another store in the plurality of stores or replacing the asset in one store in the plurality of stores with a similar asset in another store in the plurality of stores.

2. The method of claim 1 wherein the list of insurance claims further comprise a cost of restoring the asset to the condition prior to the risk event.

3. The method of claim 1 wherein calculating at least one of a likelihood of occurrence, a degree of disruption and a disruption time is performed on at least one processor.

4. The method of claim 1 further comprising presenting an indication of a mitigating action on a user interface.

5. The method of claim 1 further comprising storing in the second memory module of the CZ system, a cost of restoring the asset to a condition prior to the risk event, storing in a third memory module of a Point of Sale (POS) system, a list of transactions for the stores, each transaction in the list of transactions having a first sales volume before the risk event and a second sales volume after the risk event and wherein the mitigating action includes minimizing at least one of the disruption time, a difference between the second sales volume and the first sales volume, the cost of restoring an asset, and the value at risk.

6. The method of claim 1 wherein determining the value at risk further comprises modifying the value at risk based on an input from a subject matter expert.

7. The method of claim 1 wherein determining the value at risk further comprises modifying the value at risk based on demographic information.

8. The method of claim 1 wherein the list of risk events further comprises a type of risk and determining the value at risk is further based on the type of risk.

9. The method of claim 8 wherein the type of risk is a storm.

10. The method of claim 1 wherein the type of risk is a flood.

11. A computer-implemented method for risk mitigation comprising:

calculating on at least one processor, a likelihood of occurrence for a risk event in a list of risk events, the likelihood of occurrence based on a frequency of risk of the risk event;

calculating on the at least one special purpose computer processor, a degree of disruption for the risk event in the list of risk events, the degree of disruption based on a severity of risk of the risk event;

calculating on the at least one special purpose computer processor, a disruption time for the risk event in the list of risk events, the disruption time based on a duration of restoring an asset to a condition prior to the risk event;

determining for the risk event in the list of risk events, a value at risk based on the likelihood of occurrence, the degree of disruption and the disruption time;

determining a mitigating action to reduce the value at risk; and presenting an indication of the mitigating action on a user interface, wherein determining the mitigating action includes at least one of exchanging the asset in one store in a plurality of stores with a different asset in another store in the plurality of stores, or replacing the asset in one store in a plurality of stores with a similar asset in another store in the plurality of stores.

12. The method of claim 11 wherein the mitigating action includes minimizing at least one of a disruption time, a difference between a first sales volume before the risk event and a second sales volume after the risk event, a cost of restoring the asset to a condition prior to the risk event, and the value at risk.

13. A computer program product for risk mitigation, the computer program product comprising:

a non-transitory computer readable storage medium having computer readable program code embodied therewith, the computer readable program code comprising:

computer readable program code configured to calculate on at least one processor, a likelihood of occurrence for a risk event in a list of risk events, the likelihood of occurrence based on a frequency of risk of the risk event;

computer readable program code configured to calculate on the at least one processor, a degree of disruption for the risk event in the list of risk events, the degree of disruption based on a severity of risk of the risk event;

computer readable program code configured to calculate on the at least one processor, a disruption time for the risk event in the list of risk events, the disruption time based on a duration of restoring an asset to a condition prior to the risk event;

computer readable program code configured to determine for the risk event in the list of risk events, a value at risk based on the likelihood of occurrence, the degree of disruption and the disruption time;

computer readable program code configured to determine a mitigating action to reduce the value at risk, wherein the mitigating action is determined by at least one of exchanging the asset in one store in a plurality of stores with a different asset in another store in the plurality of stores, or replacing the asset in one store in a plurality of stores with a similar asset in another store in the plurality of stores; and computer readable program code configured to present an indication of the mitigating action on a user interface.

14. The computer program product of claim 13 wherein the computer readable program code determines a mitigating action by minimizing at least one of a disruption time, a difference between a first sales volume before the risk event and a second sales volume after the risk event, a cost of restoring the asset to a condition prior to the risk event, and the value at risk.

* * * * *